June 18, 1929.                O. H. LUDEMAN                1,717,394
                        BOILER CONTROLLING DEVICE
                        Filed Dec. 29, 1924        2 Sheets-Sheet 1

Inventor
Oscar H. Ludeman
By
   Attorney

June 18, 1929.  O. H. LUDEMAN  1,717,394
BOILER CONTROLLING DEVICE
Filed Dec. 29, 1924  2 Sheets-Sheet 2

Inventor
Oscar H. Ludeman
By W. L. Lund
Attorney

Patented June 18, 1929.

1,717,394

UNITED STATES PATENT OFFICE.

OSCAR H. LUDEMAN, OF GLEN RIDGE, NEW JERSEY, ASSIGNOR OF ONE-HALF TO EDWIN H. LUDEMAN, OF BROOKLYN, NEW YORK.

BOILER-CONTROLLING DEVICE.

Application filed December 29, 1924. Serial No. 758,785.

This invention is designed to close off the steam pipe of a boiler when the water in the boiler rises to a height which will result in the carrying over of water to the steam pipe and to preferably also close off the flow of steam from the boiler when the water in the boiler reaches a dangerously low level. It also contemplates the use of an alarm with a high or low level of water in the boiler. Other features of the invention will appear from the specification and claims.

The invention is illustrated in the accompanying drawings as follows:—

Figure 1:
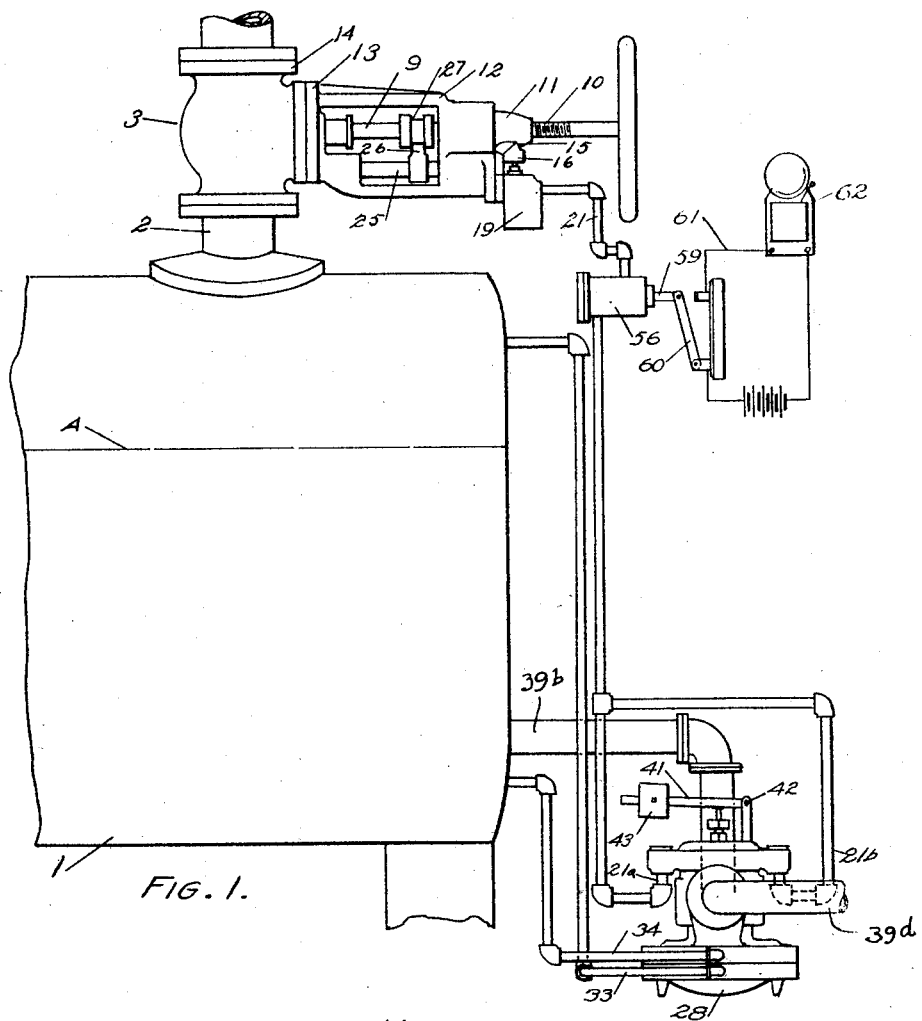

Fig. 1 shows a side elevation of a boiler with the device in place.

Figure 2:
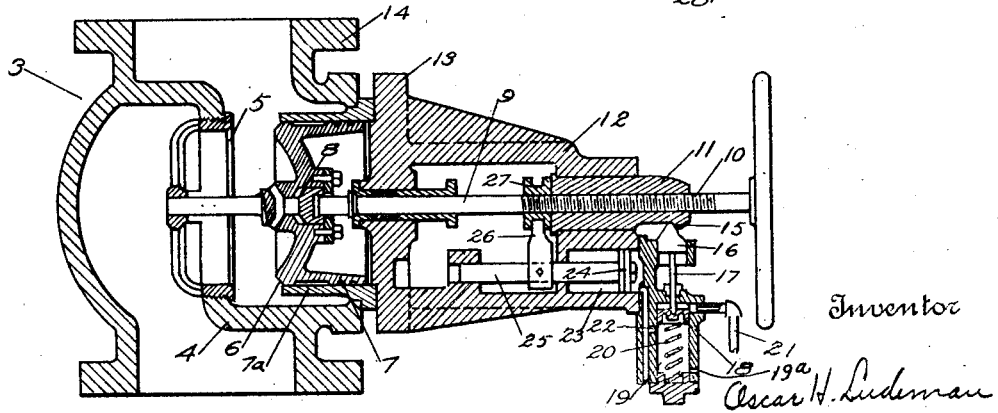

Fig. 2 a central section through the cut-off valve in the steam pipe.

Figure 3:
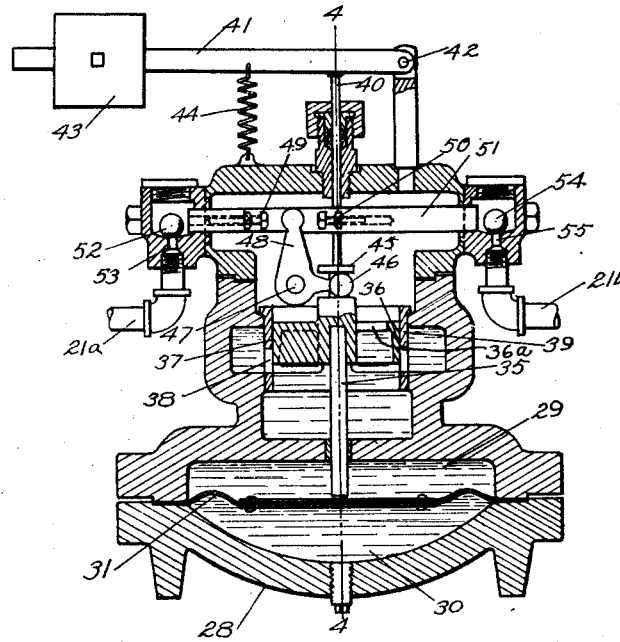
Figure 4:
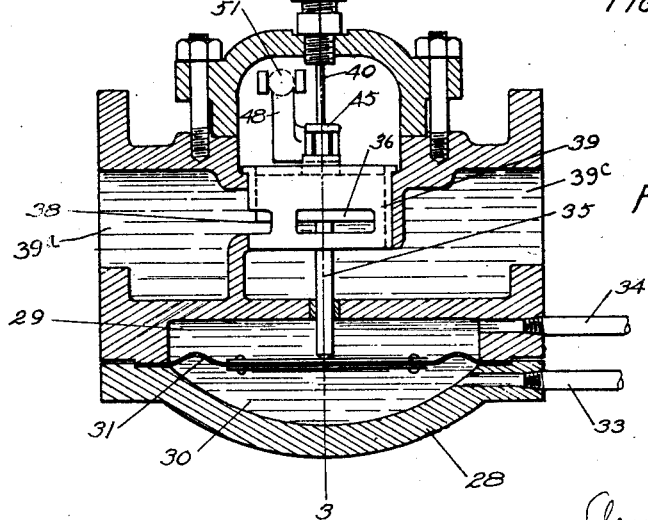

Fig. 3 a central section of a control mechanism on the line 3—3 in Fig. 4.

Fig. 4 a section on the line 4—4 in Fig. 3.

Figure 5:
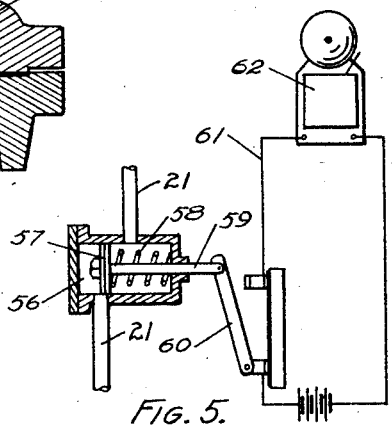

Fig. 5 shows an alarm mechanism.

1 marks the boiler which has a normal water level marked at A, 2 a steam pipe leading from the boiler, and 3 a cut-off valve controlling the steam pipe. This cut-off valve is shown immediately adjacent to the boiler but it will be understood that this may be placed quite remote from the boiler. The cut-off valve has the usual diaphragm 4 with a valve seat 5. A valve head 6 has a plunger extension 7 which operates in a cylinder 7ª.

The usual pilot valve 8 is provided in the valve head 6 from which a valve stem 9 extends. The pilot valve plunger and piston operate in the usual manner of valves of this type to assist in the operation of the valve. The stem 9 has the screw threads 10 which operate through a sliding nut 11, the sliding nut being carried by a frame 12 extending from a cap 13 on the body 14 of the valve. The sliding nut 11 has a catch shoulder 15 engaging a latch 16. The latch is connected by a pin 17 with a piston 18. The piston 18 is carried in a cylinder 19 and is normally held in latched position by a spring 20 arranged against the piston. A connection 21 leads from the upper end of the cylinder and above the piston to a source of fluid supply and when this fluid is delivered through the pipe 21 to the cylinder it moves the piston 18 downwardly releasing the latch 16 and permitting the nut 11 with the valve stem to move inwardly to close the valve. A port 22 is uncovered as the piston 18 moves downwardly and this port leads to a cylinder 23. A piston 24 is arranged in this cylinder. A rod 25 extends from the cylinder. A finger 26 is fixed on the rod 25 and engages a grooved collar 27 fixed on the stem 9. When, therefore, the fluid under pressure has been delivered through the pipe 21 and the sliding nut is released the downward movement of the piston 18 opens the port 22 permitting fluid to enter the cylinder 23 and this forces the piston 24 forwardly carrying with it the connecting mechanism to the stem 9 and thus forces the closing of the valve. A drainage opening 19ª is provided in the bottom of the cylinder which permits the drainage from the cylinder 23 and cylinder 19 upon the return of the plunger 18 under the influence of the spring.

In the construction shown fluid is delivered through a pipe 21 with an abnormal level of the water in the boiler and this is controlled through varying pressures due to such differences in water level. This is accomplished in the specific form of mechanism with which my invention is exemplified by the use of a diaphragm which is subjected to the varying pressures incident to variations of level of water in the boiler.

The diaphragm device body 28 has a chamber 29 and a chamber 30 separated by the diaphragm 31, the diaphragm being clamped between the upper and lower parts of the body. The chamber 30 is connected by a pipe 33 with the steam space of the boiler. The chamber 29 is connected by a pipe 34 with the water space, or lower portion of the boiler. The upper side of the diaphragm is subjected to the hydrostatic head varying with the water level of the boiler, this connection being made with the water space of the boiler through the pipe 34 as described. The lower part of the diaphragm is subjected to a hydrostatic head of liquid in the pipe 33 which extends upwardly above the water level to the steam space. This pipe will be filled with liquid originally, or if not so filled will soon fill with condensate from the steam and the head from this pipe will remain constant being the hydrostatic column indicated by the upright portion of the pipe 33. A pin 35 extends from the diaphragm to a valve 36 operating in a cylindrical opening 37 provided with ports 38, the valve being arranged in a body 39. The discharge side of the body 39ᶜ is connected by a pipe 39ᵇ with the water space of the boiler. The inlet side 39ª is connected by a pipe 39$^d$ with the feed water. When there is low water in the boiler, the pressure on the top of the diaphragm is reduced and the diaphragm therefore lifts, opening the valve 36. When the water level increases this adds to the pressure on the upper part of the diaphragm and thus there is a lowering of the diaphragm and in consequence a closing of the valve. A stem 40 extends upwardly from the valve through the top of the valve body and engages a weighted lever 41 pivoted on a post at 42 and provided with an adjustable weight 43 by means of which the pressure on the diaphragm may be regulated. A spring 44 gives a varying pressure on the lever so that the diaphragm may be maintained in a neutral intermediate position with the water at a normal level.

A spool 45 is arranged directly above the valve 36 and engages one arm 46 of a bell crank lever, the bell crank lever being pivoted on a pin 47 and having its opposite arm 48 in a position to engage adjustable abutments 49 and 50 on a slide 51. A ball valve 52 controls an opening 53 leading from the valve body to a pipe 21$^a$ which leads to the pipe 21. A ball valve 54 controls the passage 55 leading to a pipe 21$^b$ also connected to the pipe 21. The valve 36 is an ordinary cylindrical valve with a direct opening 36$^a$ through it so that the water from the boiler communicates through the pipe 39$^b$, body of the valve and the valve to the passages controlled by the ball checks 54 and 52. When these are opened, water from the boiler under boiler pressure is delivered through these pipes.

When a dangerously high level is reached, the higher hydrostatic head due to the water operating on the diapragm lowers the diaphragm, moves the bell crank arm 48 to the right and displaces the ball valve 54 so as to admit water to the pipe 21$^b$ and from that to the pipe 26, thus tripping the steam valve and closing off the outlet of the steam. On the other hand with a dangerously low level of water, the head through the pipe 34 being reduced below the normal there is a preponderance of pressure below the diaphragm, thus raising the same and moving the arm 48 to the left, thus tripping the valve 52 and admitting water to the pipe 21$^a$ from which it passes to the pipe 21 and trips the cut-off valve.

An alarm is provided by placing in the pipe 21 a cylinder 56, the pipe 21 being off-set on the cylinder so that the inlet is at one side of a plunger 57 and the outlet of the pipe at the opposite side of the plunger 57. A spring 58 resists the movement of the plunger. A stem 59 extends from the plunger and is connected with the movable element of a switch 60 which is designed to close a circuit 61 operating an alarm bell 62. With this device before the water can trip the cut-off valve it passes through the cylinder 56 moving the plunger 57 so as to close the circuit and give the alarm.

What I claim as new is:—

1. In a boiler controlling device, the combination of a boiler; a steam discharge passage leading from the boiler; a shut-off valve in the passage; a valve actuating mechanism comprising a latch; a valve moving means closing the valve upon the release of the latch; and devices responsive to water level of the boiler actuating the latch.

2. In a boiler controlling device, the combination of a boiler; a steam discharge passage leading from the boiler; a shut-off valve in the passage; a valve actuating mechanism comprising a latch; a fluid actuated mechanism closing the valve upon the release of the latch; and devices responsive to water level of the boiler controlling the mechanism.

3. In a boiler controlling device, the combination of a boiler; a steam discharge passage leading from the boiler; a shut-off valve in the passage; a valve actuating mechanism comprising a latch; a fluid actuated mechanism controlling the valve; and devices responsive to water level of the boiler controlling the mechanism comprising a diaphragm, and connections subjecting one side of the diaphragm to the variable pressure of the water in the boiler and the opposite side of the diaphragm to a pressure conforming to the fluid pressures of the boiler through a connection leading to the steam space, said last-mentioned connection having a constant hydrostatic head.

4. In a boiler controlling device, the combination of a boiler; a steam discharge passage leading from the boiler; a shut-off valve in the passage; and a valve actuating mechanism responsive to boiler water levels actuating the valve on an abnormal low water level in the boiler to close the valve.

5. In a boiler controlling device, the combination of a boiler; a steam discharge passage leading from the boiler; a shut-off valve in the passage; and a valve actuating mechanism responsive to boiler water levels actuating the valve on an abnormal high or low water level in the boiler to close the valve.

6. In a boiler controlling device, the combination of a boiler; a steam discharge passage leading from the boiler; a shut-off valve in the passage; a valve actuating mechanism responsive to boiler water levels actuating the valve on an abnormal water level in the boiler to close the valve; an alarm; and means responsive to low water conditions controlling said alarm.

7. In a boiler controlling device, the combination of a boiler; a steam discharge passage leading from the boiler; a shut-off valve in the passage; a valve actuating mechanism responsive to boiler water levels actuating the valve on an abnormal high or low water level in the boiler to close the valve; an alarm; and means responsive to high or low water level conditions controlling said alarm.

8. In a boiler controlling device, the combination of a boiler; a steam discharge passage leading from the boiler; a shut-off valve in the passage; a valve actuating mechanism responsive to boiler water levels; an alarm; and mechanism responsive to boiler water levels controlling said alarm, comprising a common control device controlling said actuating mechanism for both high and low water levels.

9. In a boiler controlling device, the combination of a diaphragm; a connection leading to one side of the diaphragm from below the water level of the boiler and to the other side of the diaphragm from the steam space of the boiler; a feed water line leading to the boiler; a valve controlling the feed water line actuated by the diaphragm; a steam discharge passage from the boiler; a shut-off valve controlling said passage; and means responsive to movements of the diaphragm controlling the closing of the shut-off valve.

10. In a boiler controlling device, the combination of a boiler; a steam discharge passage leading from the boiler; a shut-off valve in the passage; a fluid-actuated mechanism responsive to boiler water levels actuating the valve on an abnormally high, or low water level in the boiler to close the valve; and an alarm connected with the fluid-actuated mechanism and actuated by the fluid thereof sounding upon the operation of the mechanism in response to a low water level.

In testimony whereof I have hereunto set my hand.

OSCAR H. LUDEMAN.